(12) United States Patent
Rosset et al.

(10) Patent No.: US 10,868,862 B2
(45) Date of Patent: *Dec. 15, 2020

(54) SYSTEM AND METHOD FOR POLICY BASED FIBRE CHANNEL ZONING BASED ON STORAGE PORTS AND BUS ADAPTORS

(71) Applicant: Cisco Technology, Inc., San Jose, CA (US)

(72) Inventors: Sebastien T. Rosset, Sunnyvale, CA (US); Shrey Ajmera, Milpitas, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 187 days.

This patent is subject to a terminal disclaimer.

(21) Appl. No.: 15/795,357

(22) Filed: Oct. 27, 2017

(65) Prior Publication Data
US 2018/0054484 A1 Feb. 22, 2018

Related U.S. Application Data

(63) Continuation of application No. 13/593,229, filed on Aug. 23, 2012, now Pat. No. 9,819,737.

(51) Int. Cl.
*H04L 29/08* (2006.01)
*H04L 12/24* (2006.01)
*H04L 12/931* (2013.01)

(52) U.S. Cl.
CPC ...... *H04L 67/1097* (2013.01); *H04L 41/0813* (2013.01); *H04L 49/357* (2013.01)

(58) Field of Classification Search
CPC ........ G06F 9/5077; G06F 13/14; G06F 16/00; H04L 41/0803–0893; H04L 49/357; H04L 67/1097
See application file for complete search history.

(56) References Cited

U.S. PATENT DOCUMENTS 5,812,950 A * 9/1998 Tom .................... H04L 12/1859
  379/114.05
5,838,970 A * 11/1998 Thomas ................. G06F 9/465
  719/316

(Continued)

OTHER PUBLICATIONS

Author Unknown, "Appendix D: Configuring In-Band Management," Sun Storage Common Array Manager Installation and Setup Guide, Version 6.7.x 821-1362-10, Sun Oracle; 15 pages; Copyright © 2010, Oracle and/or its affiliates. All rights reserved. [Retrieved and printed Sep. 12, 2013] http://docs.oracle.com/cd/E19377-01/821-1362-10/inband.html.

(Continued)

*Primary Examiner* — Lance Leonard Barry
(74) *Attorney, Agent, or Firm* — Polsinelli PC (57) ABSTRACT

A methodology is provided. The methodology includes: creating a virtual storage area network between one or more storage arrays and a switch; creating a service profile for a zoning configuration, wherein the service profile is associated with at least one or more servers to create the zoning configuration; updating the zoning configuration with a worldwide port name identity for each of the one or more servers; configuring virtual host bus adapters for the service profile; associating a storage target port on one of the one or more storage arrays with a specific one of the virtual host bus adapters; and associating at least one of the one or more servers to a storage policy, wherein storage target ports can be added and removed from the storage policy, wherein a change of one of the storage target ports in the storage policy causes a change of the zoning configuration.

20 Claims, 4 Drawing Sheets

(56) References Cited

U.S. PATENT DOCUMENTS

| | | | |
|---|---|---|---|
| 6,976,090 B2* | 12/2005 | Ben-Shaul | H04L 29/12066 709/246 |
| 7,500,053 B1* | 3/2009 | Kavuri | G06F 3/0605 711/114 |
| 7,697,554 B1* | 4/2010 | Ofer | H04L 29/12594 370/381 |
| 7,706,303 B2* | 4/2010 | Bose | H04L 67/1097 370/254 |
| 7,757,059 B1 | 7/2010 | Ofer et al. | |
| 7,793,138 B2 | 9/2010 | Rastogi et al. | |
| 7,843,906 B1* | 11/2010 | Chidambaram | H04L 47/6205 370/386 |
| 7,904,599 B1 | 3/2011 | Bennett | |
| 7,930,494 B1 | 4/2011 | Goheer et al. | |
| 8,031,703 B2* | 10/2011 | Gottumukkula | H04L 41/0816 370/254 |
| 8,161,134 B2 | 4/2012 | Mishra et al. | |
| 8,218,538 B1* | 7/2012 | Chidambaram | H04L 47/6205 370/386 |
| 8,230,066 B2* | 7/2012 | Heil | G06F 11/1464 709/226 |
| 8,274,993 B2 | 9/2012 | Sharma et al. | |
| 8,335,231 B2* | 12/2012 | Kloth | H04L 45/60 370/464 |
| 8,442,059 B1* | 5/2013 | de la Iglesia | H04L 67/1097 370/389 |
| 9,207,882 B2 | 12/2015 | Rosset et al. | |
| 9,503,523 B2 | 11/2016 | Rosset et al. | |
| 2003/0118053 A1 | 6/2003 | Edsall et al. | |
| 2003/0131182 A1 | 7/2003 | Kumar et al. | |
| 2003/0149763 A1 | 8/2003 | Heitman et al. | |
| 2004/0215749 A1 | 10/2004 | Tsao | |
| 2005/0036499 A1 | 2/2005 | Dutt et al. | |
| 2005/0055428 A1 | 3/2005 | Terai et al. | |
| 2005/0185597 A1* | 8/2005 | Le | H04L 41/0866 370/254 |
| 2006/0015928 A1* | 1/2006 | Setty | H04L 12/185 725/148 |
| 2006/0034302 A1 | 2/2006 | Peterson | |
| 2006/0251111 A1* | 11/2006 | Kloth | H04L 45/60 370/464 |
| 2007/0067593 A1 | 3/2007 | Satoyama et al. | |
| 2008/0294888 A1* | 11/2008 | Ando | G06F 8/63 713/2 |
| 2009/0083484 A1 | 3/2009 | Basham et al. | |
| 2009/0094380 A1 | 4/2009 | Qiu et al. | |
| 2009/0094664 A1* | 4/2009 | Butler | G06F 11/0727 726/1 |
| 2009/0201926 A1* | 8/2009 | Kagan | H04L 12/6418 370/389 |
| 2009/0222733 A1* | 9/2009 | Basham | G06F 3/0605 715/736 |
| 2011/0022691 A1 | 1/2011 | Banerjee et al. | |
| 2011/0087848 A1 | 4/2011 | Trent | |
| 2011/0299539 A1 | 12/2011 | Rajagopal et al. | |
| 2012/0134672 A1 | 5/2012 | Banerjee | |
| 2012/0144014 A1 | 6/2012 | Natham et al. | |
| 2012/0254440 A1 | 10/2012 | Wang | |
| 2012/0331119 A1 | 12/2012 | Bose et al. | |
| 2013/0013664 A1 | 1/2013 | Baird et al. | |
| 2013/0036212 A1* | 2/2013 | Jibbe | H04L 67/1095 709/223 |
| 2013/0138836 A1* | 5/2013 | Cohen | H04L 49/351 709/250 |
| 2013/0163606 A1* | 6/2013 | Bagepalli | H04L 49/70 370/409 |
| 2013/0212130 A1* | 8/2013 | Rahnama | H04W 4/021 707/792 |
| 2013/0212345 A1* | 8/2013 | Nakajima | G06F 3/0605 711/161 |
| 2014/0039683 A1 | 2/2014 | Zimmermann Arnaldo et al. | |
| 2014/0059187 A1 | 2/2014 | Rosset et al. | |
| 2014/0219086 A1 | 8/2014 | Cantu' et al. | |
| 2014/0307578 A1 | 10/2014 | DeSanti | |
| 2014/0365622 A1 | 12/2014 | Lyengar et al. | |

OTHER PUBLICATIONS

Author Unknown, "Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013, 3 pages.

Author Unknown, "EMC Unisphere:Innovative Approach to Managing Low-End and Midrange Storage; Redefining Simplicity in the Entry-Level and Midrange Storage Markets," Data Sheet, EMC Corporation; 6 pages; © 2013 EMC Corporation. All Rights Reserved. Published on or about Jan. 4, 2013.

Author Unknown, "HP XP Array Manager Software—Overview & Features," Storage Device Management Software; Hewlett-Packard Development Company, 2013, 3 pages.

Author Unknown, "VBlock Solution for SAP: Simplified Provisioning for Operation Efficiency," VCE White Paper, VCE—The Virtual Computing Environment Company, Aug. 2011, 11 pages.

Author Unknown, "Coraid Virtual DAS (VDAS) Technology: Eliminate Tradeoffs between DAS and Networked Storage," Coraid Technology Brief, © 2013 Cora id, Inc., Published on or about Mar. 20, 2013, 2 pages.

Cisco, "N-Port Virtualization in the Data Center," Cisco White Paper, Cisco Systems, Inc., Mar. 2008, 6 pages.

Hosterman, Cody, et al., "Using EMC Symmetrix Storage inVMware vSphere Environments," Version 8.0, EMC²Techbooks, EMC Corporation; published on or about Jul. 8, 2008, 314 pages; [Retrieved and printed Sep. 12, 2013] http://www.emc.com/collateral/hardware/solution-overview/h2529-vmware-esx-svr-w-symmetrix-wp-ldv.pdf.

Swami, Vijay, "Simplifying SAN Management for VMWare Boot from SAN, Utilizing Ciscco UCS and Palo," http://virtualeverything.wordpress.com/2011/05/31/simplifying-san-management-for-vmware-boot-from-san-utilizing-cisco-ucs-and-palo/ posted May 31, 2011, 6 pages.

* cited by examiner

SYSTEM AND METHOD FOR POLICY BASED FIBRE CHANNEL ZONING BASED ON STORAGE PORTS AND BUS ADAPTORS

CROSS REFERENCE TO RELATED APPLICATION

This application is a continuation application of U.S. patent application Ser. No. 13/593,229, filed Aug. 23, 2012 (allowed), which is expressly incorporated herein by reference in its entirety.

TECHNICAL FIELD

This disclosure relates in general to the field of communications and, more particularly, to policy based fibre channel zoning for virtualized and stateless computing in a network environment.

BACKGROUND

Networking architectures have grown increasingly complex in communications environments, particularly storage area network environments. A storage area network includes a number of entities such as hosts, fibre channel (FC) switches, disk arrays, tape devices, etc. Access control is often an important consideration in storage area network implementation. For example, a fibre channel switch may include a zoning table that specifies access rights for various initiators and targets in a fibre channel storage area network. However, current zoning mechanisms for providing access control in storage area networks have significant limitations. With virtualization, stateless computing and cloud infrastructures, changes to the computer and storage infrastructure are more frequent, which increases the complexity of FC zoning tasks and creates a significant challenge in managing fibre channel zoning.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes connecting one or more storage arrays to a switch; connecting one or more servers to the switch; creating a virtual storage area network between the one or more storage arrays and the switch; creating a service profile for a zoning configuration; and associating at least one of the one or more servers to the service profile for the zoning configuration. Note that the term 'connecting' in this context can include any activity associated with coupling, provisioning, configuring, interfacing, or otherwise establishing a link of any kind. In more specific examples, the method can include configuring virtual host bus adapters for the service profile; configuring parameters for each of the virtual host bus adapters; and associating a target port on one of the one or more storage arrays with a specific one of the virtual host bus adapters.

The creation of the service profile may include creating a boot path. Additionally, the creation of the boot path may include specifying a storage area network for the boot path; specifying a virtual host bus adapter for the boot path; and specifying a target boot port. In certain example implementations, the method can include determining worldwide port name identities for the one or more servers based on underlying hardware for the one or more servers being changed. The zoning configuration can be updated with the worldwide port name identities. The servers in the architecture can be virtual servers in certain instances.

EXAMPLE EMBODIMENTS

Figure 1:
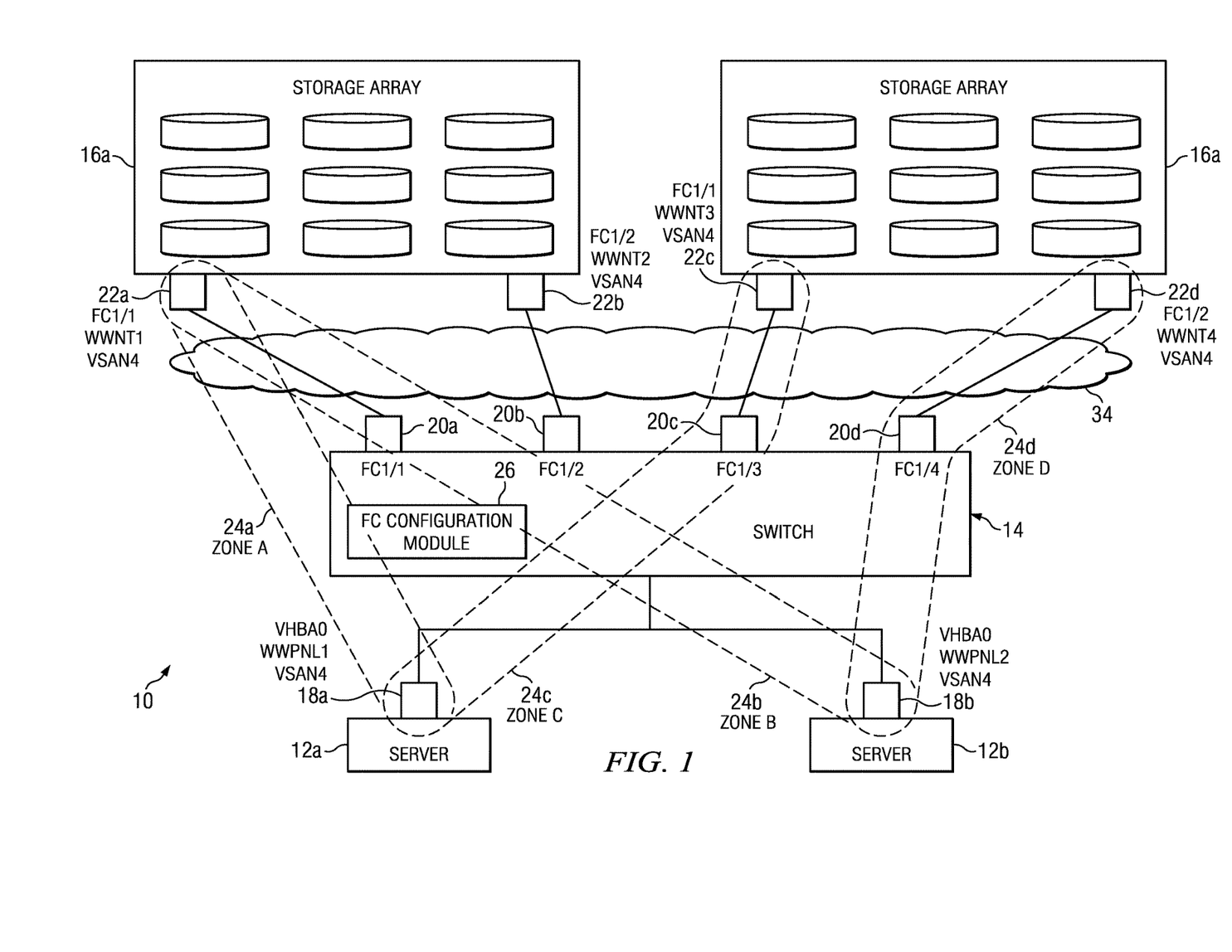
FIG. 1 is a simplified block diagram of a communication system for policy based fibre channel zoning in accordance with one embodiment of the present disclosure.

Turning to FIG. 1, FIG. 1 is a simplified block diagram of a communication system 10 for policy based fibre channel (FC) zoning for virtualized and stateless computing in accordance with one embodiment of the present disclosure. Communication system 10 includes servers 12*a* and 12*b*, a switch 14, a plurality of storage devices 16*a* and 16*b* (e.g., a storage array), and a network 34. Server 12*a* includes a server port 18*a* and server 12*b* includes a server port 18*b*. Server port 18*a* and server port 18*b* allow servers 12*a* and 12*b* to respectively communicate with switch 14. In an embodiment, servers 12*a* and 12*b* may be physically attached to fabric extenders, either through direct cabling or through fabric extender connections to provide more physical ports so more servers can be connected. Network 34 may be a virtual storage area network (VSAN) in particular embodiments of the present disclosure.

Switch 14 includes FC switch ports 20*a-d* and can support fibre channel (FC) and FC over Ethernet (FCoE) protocols. Storage 16*a* includes FC storage ports 22*a* and 22*b*. Storage 16*b* includes FC storage ports 22*c* and 22*d*. An Illustrated zone A 24*a* represents a zone connection between server 12*a* and storage 16*a*. An Illustrated zone B 24*b* represents a zone connection between server 18*b* and storage 16*a*. An Illustrated zone C 24*c* represents a zone connection between server 18*a* and storage 16*b*. An Illustrated zone D 24*d* represents a zone connection between server 18*b* and storage 18*b*.

In one particular instance, communication system 10 may be configured to define and apply FC zoning policies in a way that can reduce the number of provisioning and maintenance operations. Communication system 10 may be particularly suited to a virtualized and stateless computing environment, where logical computers are associated with physical computers and the associations can change over time. When associations do change over time, communication system 10 may be configured to automatically react to events and update FC zones (e.g., zone A 24a, zone B 24b, zone C 24c, and zone D 24d) according to the zoning policy.

More specifically, communication system 10 can be configured to allow users to define storage policies that apply to logical computers. The FC zoning configurations can then be automatically applied and follow any changes to the physical infrastructure, such as replacing a physical computer or changing the association between a logical computer and a physical computer. Storage policies may be expressed using a high-level representation (e.g., storage exposed to computers), rather than traditional zones containing device identifiers (e.g., a zone containing worldwide name (WWN) identifiers). One potential advantage of such a configuration is that there is no need to manage device credentials because zones can be configured using early or late binding. Early binding is more static, but potentially consumes more zone entries. Late binding is more dynamic and unused resources do not consume zone entries unnecessarily. In an embodiment, a server template can be created and any server created from the template would inherit the zoning policy.

In an embodiment, communication system 10 can allow for automatically configured FC zoning in a unified computing system (UCS)/fabric interconnect (FI) environment starting from some higher level identifiers available to UCS managers. These identifiers are essentially the service profiles on the compute side and the FI storage port(s) on the FI side. Communication system 10 can function on FC and/or FCoE networks, or function on other networks where appropriate.

For purposes of illustrating certain example techniques of communication system 10, it is important to understand the communications that may be traversing the network. The following foundational information may be viewed as a basis from which the present disclosure may be properly explained. Provisioning FC zones involves many operations that are often manual or semi-manual, where server administrators have to inventory servers and FC storage adapters, have a process to maintain the inventory up-to-date, and share inventory data with storage administrators. To facilitate the inventory, server and storage administrators need to exchange information about storage requirements for each server. The storage administrator would then configure zones and make sure the zones are maintained regularly to keep up with changes made by server administrators. When hardware components are replaced, a storage administrator may have to re-configure FC zones. Unfortunately, products that automate these tasks are often scripted and not model-based. Often there is a need to manage multiple devices that have their own interface and user access control scheme, as well as ensure zones do not become stale. The provisioning tasks need to be performed when servers are added or removed and when FC storage port are added or removed.

In accordance with one example implementation, communication system 10 can allow policy based fibre channel zoning for virtualized and stateless computing. In operation, communication system 10 may be configured for automatic in-band discovery of computers and their components, including FC storage adapters. Communication system 10 may also maintain an inventory of the computers and monitor the health of the computers (without requiring the entry of any device credentials), as well as provide inventory reports to users. In addition, communication system 10 may also provide a role-based access control system such that provisioning tasks can be separated, for example, between computer administrators and storage administrators. Logical computers can be deployed on any physical computer that supports the logical configuration requirements of the logical computer. In one example, the logical configuration specifies whether to use WWN addresses burned in the server hardware or virtual WWN addresses. Logical computers can be defined even if no physical computer exists and logical computers may be deployed over physical computers, which cause the physical computer to be configured as specified in the logical computer, including WWN addresses for storage adapters.

Communication system 10 may be configured to automatically provision FC zoning in a stateless computer environment, where a user can define storage policies that specify one or more FC storage ports. The storage policies can be applied to one or more logical computers. FC zones can be automatically configured based on the association between storage policies, logical servers, and physical computers. In addition, FC zone configuration may be automatically maintained up-to-date by reacting to user actions or system events such as modifying storage policies, modifying logical servers, replacing hardware components, etc. For example, a logical computer can be moved from one physical computer to another and the zoning can be updated automatically. The provisioning step can be performed in any order and the system can automatically react by adjusting the zone configuration.

In an illustrative example, users can define a storage policy once and apply the storage policy to many computers. When the policy is changed, the change is applied to all the computers associated with the storage policy. More specifically, a storage policy can consist of one or more entries including but not limited to a name of the FC adaptor present inside a computer and a target storage port identity (e.g., WWN) to identify the device the computer will connect with. The storage policy can allow the system to automatically react to computer modifications (e.g., FC adaptor cards added/removed, changed logical configuration (WWN) of the adaptor card, etc.) by recalculating and reapplying FC zones after a modification.

When applying a storage policy to a computer, zones and zone-sets are automatically created by the system and every storage policy, zone, zone-set, and zone-set scheduling policy is maintained as a separate object in the system. Storage target ports and FC adaptor ports can also be maintained as separate objects under the storage policy. In an embodiment, zone name & zone-set name are the attributes of the zone & zone-set objects.

For adding/removing zones, corresponding ports can be added/removed from the storage policy. For example, removing port 22a from the storage policy, zone A 24a and zone B 24b will be automatically deleted from the switch and their corresponding objects will be deleted from the management system.

A zone-set can be automatically created per VSAN and zones may be added as members of the zone-set. Zone-set activation can be immediate or scheduled and a zone-set scheduling policy can be created for scheduled zone-set activations. In an embodiment, a zone-set is reactivated immediately on any zone modification. In another embodiment, scheduled zone-set activations may be provided as an immediate zone-set activation can be a disruptive operation and may cause data corruption if arbitrarily done.

An aspect of doing implicit zoning is to generate globally unique names for zones and zone-sets while maintaining the max zone name length limitation of 64 characters. The generated names can also provide details about the FC adaptor port and storage-target port members of the zone. In one particular example, the management subsystem uses an "ucs_System-Name_uniqueId_switchId_XXXX" format for generating zone name and uses an "ucs_System-Name_vsanId_switchId_zoneset" format for generating zone-set name. By creating a name of a system, the zone name can be unique across multiple systems.

In one example implementation, the unique name includes a unique ID of a zone across a system and an ID of the VSAN under which the zone/zoneset was created. Also, an ID of a switch (e.g., switch 14) on which the zone/zoneset will be deployed is determined. A descriptive string about the zone is created and the descriptive string can include a logical server name and a FC initiator name. The combination of "system-name" and "uniqueID" makes the zone name globally unique, similarly the combination of "system-name" and "vsanID" makes a zoneset name globally unique.

Servers can have hardware-based WWNs or virtualized WWNs. A storage policy can contain both hardware based and virtualized WWNs. The zoning automatically follows a logical computer when moved from one physical computer to another physical computer because the identity moves with logical computer. Further, the zones can be automatically created/deleted/re-activated on any hardware changes In an embodiment, two types of zones may be configured per logical computer, a single target zone (SIST) and a single initiator multiple target zone (SIMT). A SIST is a zone consisting of one FC adaptor port identity and one storage target port identity. A SIMT is a zone consisting of one FC adaptor port identity and multiple storage target ports identities. The SIMT can help in reducing the zone count on a switch and may help prevent failure scenarios.

High availability (HA) configurations for storage targets reachable from two paths can be done using the storage policy. The "path" attribute of the storage-target port in the storage-policy can be used for specifying the path through which the target is reachable. For example, if the target is reachable only through a switch A then it is zoned only with the FC adaptor port connected to the switch A.

Communication system 10 can be configured as basic zoning, enhanced zoning, and smart zoning and can provide automatic zone merge conflict resolution. For example, upon detection of a zone merge conflict, a full zone set from a neighbor switch may be automatically imported. Then, the parameters causing conflict (e.g., zone name, zone-set name, domain ID, etc.) may be automatically changed and the modified zone-set can be re-activated.

Informative faults can be automatically raised for failure scenarios (e.g., maintaining a zone limit of 8000 zones per switch, a zone-set limit of 8000 zone-sets per switch, a device-alias limit of 2048 per switch, etc.). Communication system 10 can be configured to automatically maintain the zone statistics and fail deployments and raises faults when a limit is reached. In addition, the system may be configured to detect a zone merge conflict, raise a fault alert, and start automatic resolution of the zone merge conflict.

The FC zones can be created upfront (early binding) or on an as needed basis (late binding). In early binding, FC zones are created at the time of the logical computer (e.g., service profile) is created. At the creation time, the logical computer is not bound to any physical computer and all the adapter identities (i.e., WWN) in the logical computer would be the virtualized WWNs. This can be useful when storage configuration needs to be ready before powering up the physical computers. In late binding, FC zones are created when the logical computer is applied on a physical computer. The adaptor identities (i.e., WWN) can be virtual or can be inherited from the burned-in identities on the physical computer. The can be useful because resources are used only on as needed basis. Another type of late binding is to create a zone only when the FC interface (e.g., virtual host bus adapter (vHBA)) is enabled. This could be done by intercepting the fiber login (FLOGI) of the FC interface.

Strict privileges for the creation of vHBA and vHBA groups may be allowed, where one user can create a server without being able to create vHBA/groups and another user can create vHBA/groups without being able to create service profiles. Because the system is a unit of management, there is no need for managing device credentials (such as methods using SNMP-based SET).

In terms of the infrastructure of the present disclosure, servers 12a and 12b can be associated with clients, customers, endpoints, or end users wishing to initiate a communication in communication system 10 via some network. The term 'server' is inclusive of devices used to serve the requests of clients and/or perform some computational task on behalf of clients within communication system 10. Servers 12a and 12b may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Switch 14 may be configured to connect one or more servers (e.g., servers 12a and 12b) to a network (e.g., network 34). Switch 14 may resemble a network switch or hub, relaying data between connected devices (e.g., servers 12a and 12b and storage 16a and 16b). Generally, switch 14 allows devices to communicate with other devices.

Network 34 represents a series of points or nodes of interconnected communication paths for receiving and transmitting packets of information that propagate through the architecture. Network 34 offers a communicative interface between sources and/or hosts, and each may be any local area network (LAN), wireless local area network (WLAN), metropolitan area network (MAN), Intranet, Extranet, WAN, virtual private network (VPN), or any other appropriate architecture or system that facilitates communications in a network environment. The architecture of the present disclosure may include a configuration capable of supporting FC and/or FCoE communications.

Servers 12a and 12b, switch 14, and storage arrays 16a and 16b are network elements that can facilitate the channel zoning activities discussed herein. As used herein in this Specification, the term 'network element' is meant to encompass any of the aforementioned elements, as well as routers, switches, cable boxes, gateways, bridges, loadbalancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, servers 12a and 12b, switch 14, and storage arrays 16a and 16b include software to achieve (or to foster) the activities discussed herein. This could include the implementation of instances of an FC configuration module 26. Additionally, each of these elements can have an internal structure (e.g., a processor, a memory element, etc.) to facilitate some of the operations described herein. In other embodiments, these activities may be executed externally to these elements, or included in some other network element to achieve the intended functionality. Alternatively, servers 12*a* and 12*b*, switch 14, and storage arrays 16*a* and 16*b* may include software (or reciprocating software) that can coordinate with other network elements in order to achieve the activities described herein. In still other embodiments, one or several devices may include any suitable algorithms, hardware, software, components, modules, interfaces, or objects that facilitate the operations thereof.

Figure 2:
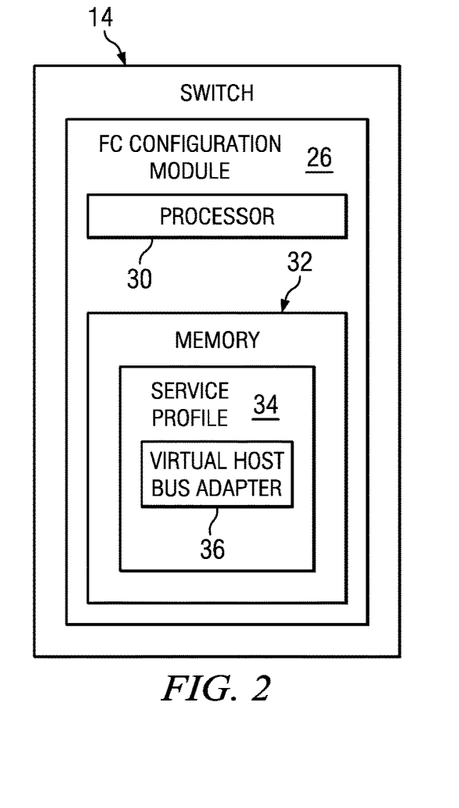
FIG. 2 is a simplified block diagram illustrating possible example details associated with the communication system.

Turning to FIG. 2, FIG. 2 is a simplified block diagram illustrating one possible set of details associated with communication system 10. This particular configuration includes switch 14. Switch 14 includes FC configuration module 26. FC configuration module 26 can include a processor 30 and a memory 32. Memory 32 can include a service profile 34 and a virtual host bus adapter (vHBA) 36. In operational terms, FC configuration module may allow FC zoning configurations to be automatically applied and follow any changes to the physical infrastructure of communication system 10, such as replacing a physical computer or changing the association between a logical computer and a physical computer.

Figure 3:
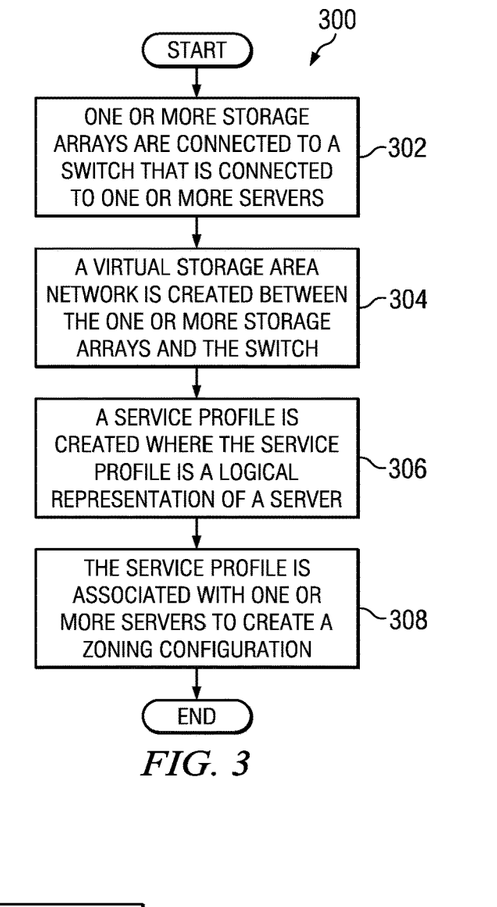
FIG. 3 is a simplified flowchart illustrating potential operations associated with the communication system.

Turning to FIG. 3, FIG. 3 is a simplified flowchart 300 illustrating example activities of policy based fibre channel zoning for virtualized and stateless computing. At 302, one or more storage arrays are connected to a switch that is connected to one or more servers. At 304, a VSAN is created between the one or more storage arrays and the switch. At 306, a service profile is created, where the service profile is a logical representation of a server. At 308, the service profile is associated with one or more servers to create a zoning configuration.

Figure 4:
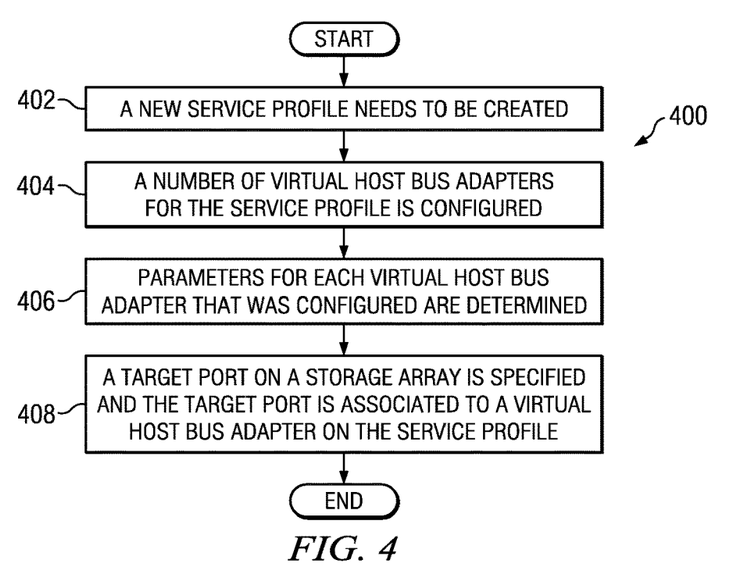
FIG. 4 is another simplified flowchart illustrating potential operations associated with the communication system.

Turning to FIG. 4, FIG. 4 is a simplified flowchart 400 illustrating example activities of policy based fibre channel zoning for virtualized and stateless computing. At 402, a new service profile needs to be created. In one implementation, the service profile is a logical representation of a server. At 404, a number of vHBAs for the service profile is configured. For example, a number of vHBAs may be configured and stored in vHBA 36. At 406, parameters for each virtual host bus adapter that was configured are determined. At 408, a target port on a storage array is specified and the target port is associated to a vHBA on the service profile.

Figure 5:
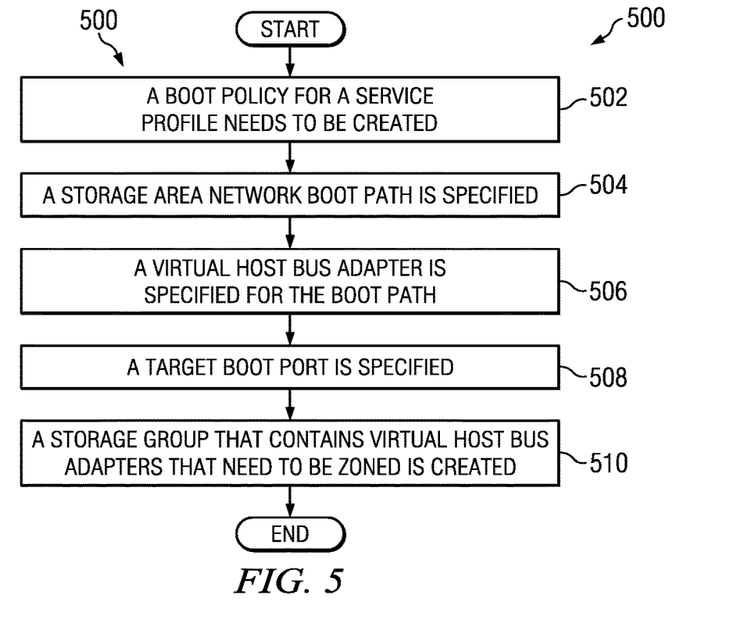
FIG. 5 is another simplified flowchart illustrating potential operations associated with the communication system.

Turning to FIG. 5, FIG. 5 is a simplified flowchart 500 illustrating example activities of policy based fibre channel zoning for virtualized and stateless computing. At 502, a boot policy for a service profile needs to be created. For example, a boot policy for a service profile stored in service profile 34 may need to be created. At 504, a storage area network (SAN) boot path is specified. At 506, a vHBA is specified for the boot path. At 508, a target boot port is specified. At 510, a storage group that contains vHBAs that need to be zoned is created, thereby creating a boot policy for a service profile.

Figure 6:
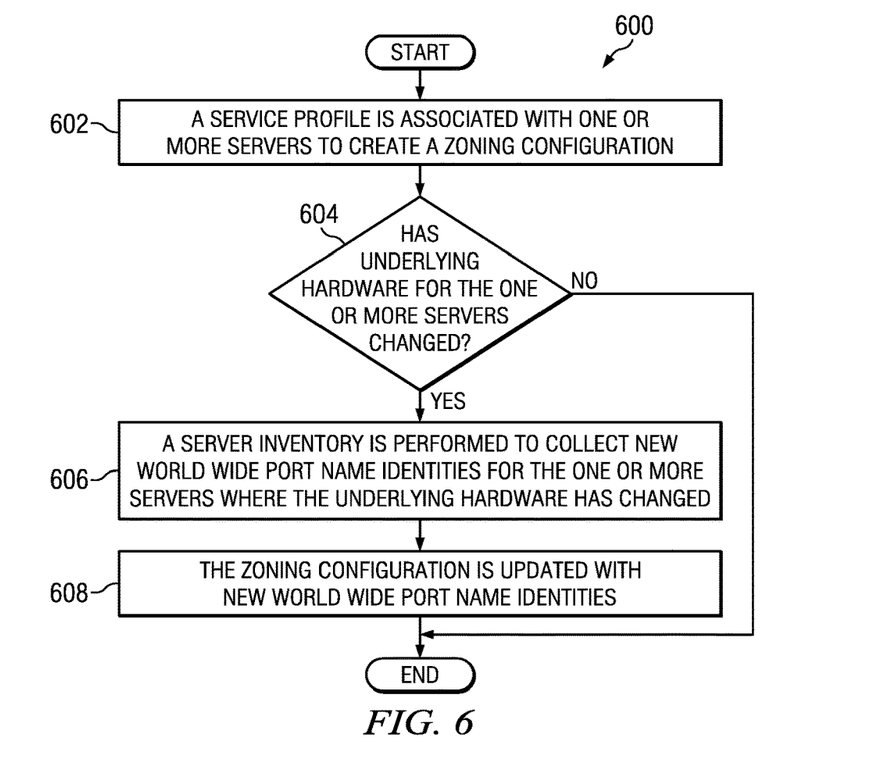
FIG. 6 is another simplified flowchart illustrating potential operations associated with the communication system.

Turning to FIG. 6, FIG. 6 is a simplified flowchart 600 illustrating example activities of policy based fibre channel zoning for virtualized and stateless computing. At 602, a service profile is associated with one or more servers to create a zoning configuration. At 604, the system determines if any underlying hardware for the one or more servers has changed. If the system determines that no underlying hardware for the one or more servers has changed, then the process ends. If the system determines that underlying hardware for the one or more servers has changed, then a server inventory is performed to collect new worldwide port name (WWPN) identities for the one or more servers, where the underlying hardware has changed, as illustrated at 606. At 608, the zoning configuration is updated with new WWPN name identities.

Figure 7:
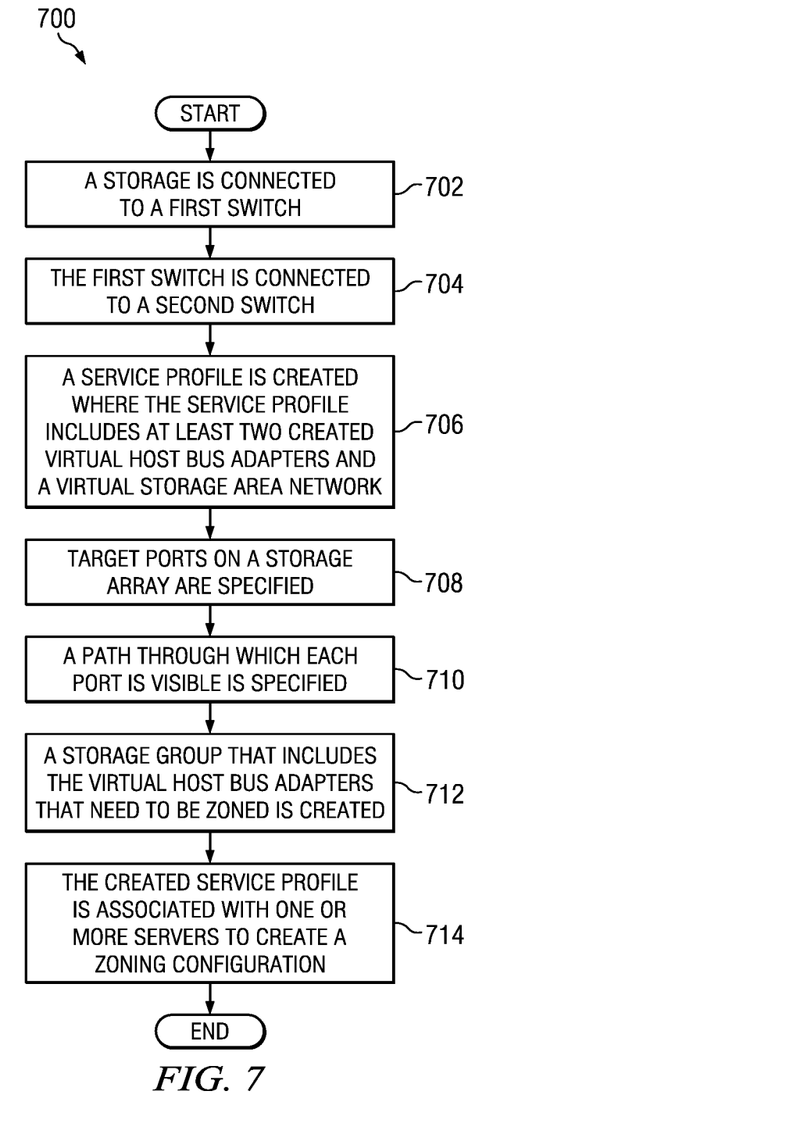
FIG. 7 is another simplified flowchart illustrating potential operations associated with the communication system.

Turning to FIG. 7, FIG. 7 is a simplified flowchart 700 illustrating example activities of policy based fibre channel zoning for virtualized and stateless computing. At 702, a storage is connected to a first switch. At 704, the first switch is connected to a second switch. At 706, a service profile is created, where the service profile includes at least two created vHBAs and a VSAN. At 708, target ports on a storage array are specified. At 710, a path through which each port is visible is specified. At 712, a storage group that includes the vHBAs that need to be zoned is created. At 714, the created service profile is associated with one or more servers to create a zoning configuration.

Any of these elements (e.g., the network elements of FIG. 1) can include memory elements for storing information to be used in achieving the channel zoning activities as outlined herein. Additionally, each of these devices may include a processor that can execute software or an algorithm to perform the channel zoning management activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and, further, can accommodate a large number of components, as well as more complicated/sophisticated arrangements and configurations. Accordingly, the examples provided should not limit the scope or inhibit the broad teachings of communication system 10, as potentially applied to a myriad of other architectures.

It is also important to note that the steps in the preceding FIGURES illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   creating a virtual storage area network between one or more storage arrays and a switch;
   creating a service profile for a zoning configuration, wherein the service profile is associated with at least one or more servers to create the zoning configuration;
   updating the zoning configuration with a worldwide port name identity for each of the one or more servers;
   configuring virtual host bus adapters for the service profile;
   associating a storage target port on one of the one or more storage arrays with a specific one of the virtual host bus adapters; and
   associating at least one of the one or more servers to a storage policy, wherein storage target ports can be added and removed from the storage policy, wherein a change of one of the storage target ports in the storage policy causes a change of the zoning configuration.

2. The method of claim 1, wherein the creating the service profile includes configuring parameters for each of the virtual host bus adapters.

3. The method of claim 1, wherein the creating the service profile includes creating a boot path.

4. The method of claim 3, wherein the creating the boot path comprises:
   specifying a storage area network for the boot path;
   specifying a virtual host bus adapter for the boot path; and
   specifying a target boot port.

5. The method of claim 1, wherein at least one of the one or more servers is a virtual server.

6. The method of claim 1, further comprising determining, before the updating, the worldwide port name identity for each of the one or more servers.

7. The method of claim 1, wherein the storage policy include an identifier of a fibre channel adaptor.

8. A non-transitory computer readable media storing instructions for execution and when executed by a processor is operable to cause the processor to perform operations comprising:
   creating a virtual storage area network between one or more storage arrays and a switch;
   creating a service profile for a zoning configuration, wherein the service profile is associated with at least one or more servers to create the zoning configuration;
   updating the zoning configuration with a worldwide port name identity for each of the one or more servers;
   configuring virtual host bus adapters for the service profile;
   associating a storage target port on one of the one or more storage arrays with a specific one of the virtual host bus adapters; and
   associating at least one of the one or more servers to a storage policy, wherein storage target ports can be added and removed from the storage policy, wherein a change of one of the storage target ports in the storage policy causes a change of the zoning configuration.

9. The non-transitory computer readable media of claim 8, wherein the creating the service profile comprises associating at least one specific storage target port on one of the one or more storage arrays with a specific one of the virtual host bus adapters.

10. The non-transitory computer readable media of claim 8, wherein the creating the service profile includes creating a boot path.

11. The non-transitory computer readable media of claim 10, wherein the creating the boot path comprises: specifying a storage area network for the boot path; specifying a virtual host bus adapter for the boot path; and specifying a target boot port.

12. The non-transitory computer readable media of claim 8, wherein at least one of the one or more servers is a virtual server.

13. The non-transitory computer readable media of claim 8, further comprising determining, before the updating, the worldwide port name identity of each of the one or more servers.

14. The non-transitory computer readable media of claim 8, wherein the storage policy include an identifier of a fibre channel adaptor.

15. An apparatus comprising:
   a memory element configured to store instructions;
   a processor coupled to the memory element; and
   wherein the processor in cooperation with the memory is configured to:
      create a virtual storage area network between one or more storage arrays and a switch;
      create a service profile for a zoning configuration, wherein the service profile is associated with at least one or more servers to create the zoning configuration;
      update the zoning configuration with a worldwide port name identity for each of the one or more servers;
      configuring virtual host bus adapters for the service profile;
      associate a storage target port on one of the one or more storage arrays with a specific one of the virtual host bus adapters; and
      associate at least one of the one or more servers to a storage policy, wherein storage target ports can be added and removed from the storage policy, wherein a change of one of the storage target ports in the storage policy causes a change of the zoning configuration.

16. The apparatus of claim 15, wherein the creation of the service profile includes configuring parameters for each of the virtual host bus adapters.

17. The apparatus of claim 15, wherein the creation of the service profile includes creating a boot path.

18. The apparatus of claim 17, wherein the creation of the boot path comprises: specifying a storage area network for the boot path; specifying a virtual host bus adapter for the boot path; and specifying a target boot port.

19. The apparatus of claim 15, wherein at least one of the one or more servers is a virtual server.

20. The apparatus of claim 15, further comprising determining, before the update, the worldwide port name identity of each of the one or more servers.

\* \* \* \* \*